(No Model.)
C. W. GLIDDEN.
ROTARY CUTTER FOR LEATHER TRIMMING MACHINES.
No. 459,348. Patented Sept. 8, 1891.
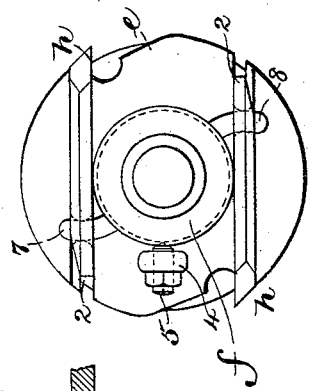
Fig. 2
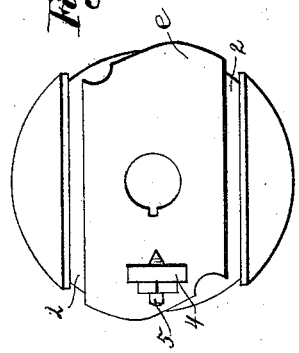
Fig. 4
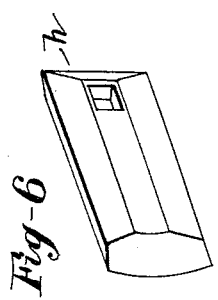
Fig. 6
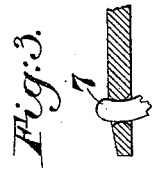
Fig. 3
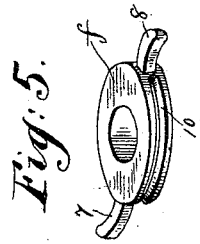
Fig. 5
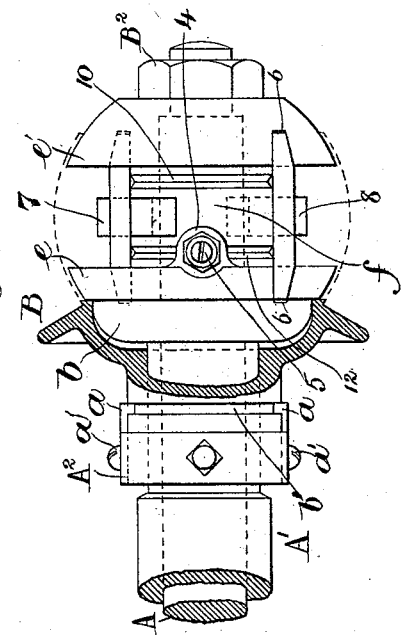
Fig. 1
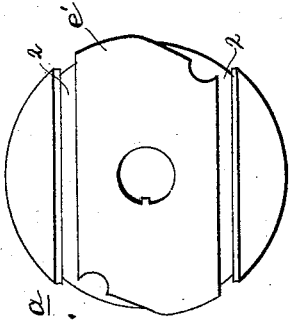
Fig. 3ª
Witnesses.
Fred S. Greenleaf
Frederick L. Emery
Inventor.
Charles W. Glidden,
by Crosby & Gregory
Attys.

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

ROTARY CUTTER FOR LEATHER-TRIMMING MACHINES.

SPECIFICATION forming part of Letters Patent No. 459,348, dated September 8, 1891.

Application filed February 3, 1891. Serial No. 380,020. (No model.)

*To all whom it may concern:*

Be it known that I, CHARLES W. GLIDDEN, of Lynn, county of Essex, State of Massachusetts, have invented an Improvement in Rotary Cutters for Leather-Trimming Machines, of which the following description, in connection with the accompanying drawings, is a specification, like letters and figures on the drawings representing like parts.

This invention has for its object the production of a novel rotary cutter employed chiefly in heel-trimming machines.

The invention herein to be covered relates chiefly to means for adjusting the cutter simultaneously and equally, to provide for grinding and for other purposes.

In accordance with my invention a collar adjustable about the cutter-shaft has arms which contact with and adjust the blades in their carrying-plates fixed to the shaft.

Figure 1 in side elevation, with the tread-guard broken out, represents a rotary cutter embodying my invention; Fig. 2, a detail of the cutter with the outer plate or disk removed; Fig. 3, a detail showing one of the blades with the slot to be entered by the arms of the hub. Fig. 3ª is a detail of the plate e'. Fig. 4 is a detail of the plate e. Fig. 5 is a perspective view of the adjustable collar. Fig. 6 is a perspective view of one of the blades.

The rotary shaft A of the heel-trimming machine turns in suitable sleeve-like journals A', having fast on it externally the collar A². This collar has lipped dogs a, held in place by screws a', the said lips entering an annular groove b' in the neck of the tread-guard plate B.

The shaft A has a fixed collar b, and at its end it has a screw-thread, on which is screwed the nut B². The two disks or plates e e', forming parts of the cutter and grooved or slotted at their inner sides, as at 2 2, are held fixedly on the shaft by the nut, as described, and between the nut and collar. The disk or plate e has an ear 4, which receives a screw 5, adapted to engage and hold in place the sleeve f, having the two arms or wings 7 8, which act against the inner or rear ends of the two blades h h, having wedge-shaped or beveled edges (see Figs. 1 and 6) inserted in the grooves 2 2 in the disks or plates e e', each groove 2 2 being a little deeper than the beveled edge entering it, so that the said edge will not bottom in the groove, but so that a space 6 will be left, as in Fig. 1. If the edges of the blades bottomed in the grooves, then the blades could not be as firmly and practically held by disks or plates. After loosening the set-screw 5 the collar or sleeve f may be turned and cause the arms 7 8 to act on and push the blades outward longitudinally to be ground back to standard diameter, as provided for in an application, Serial No. 269,520, filed by me.

The sleeve f, (see Figs. 2 and 5,) when desired, may be taken off the shaft A and reversed, to thus place the convexed sides of the arms in contact with the blades, the sleeve f having a second groove 10 to be entered by the screw 5, shown as in the groove 12 of the cutter.

I claim—

1. A rotary cutter composed of two disks or plates grooved on their inner faces and longitudinally-adjustable blades having their edges guided in the said grooves, combined with a collar having radial arms engaging and adapted to adjust the two blades, substantially as described.

2. A rotary cutter composed of two disks or plates grooved at their inner sides and blades having their edges guided in the said grooves, combined with a collar having arms to act upon and adjust the two blades and a tread-lift guide B, substantially as described.

3. The shaft, its two disks or plates provided with grooves, and blades entering the said grooves, combined with a collar having curved wings and a set-screw to hold the said collar in place after it has been rotated to adjust the blades, substantially as described.

4. In a rotary heel-trimming cutter, a shaft, two disks or plates thereon having tapering grooves, and means to hold the disks on the shaft, combined with blades, each having an edge beveled to enter said grooves, the beveled edge of the blade being of less depth than the depth of the groove in the cutter, whereby the said edge of the blade does not bottom in the groove, the combination being and operating substantially as described.

In testimony whereof I have signed my name to this specification in the presence of two subscribing witnesses

CHARLES W. GLIDDEN.

Witnesses:
W. C. WILLSON,
H. P. FAIRFIELD.